United States Patent
Skalecki et al.

(10) Patent No.: US 8,750,141 B2
(45) Date of Patent: Jun. 10, 2014

(54) DISTRIBUTED CONNECTION ESTABLISHMENT AND RESTORATION

(75) Inventors: Darek Skalecki, Kanata (CA); Peter Ashwood-Smith, Hull (CA)

(73) Assignee: Rockstar Consortium US LP, Plano, TX (US)

( * ) Notice: Subject to any disclaimer, the term of this patent is extended or adjusted under 35 U.S.C. 154(b) by 887 days.

(21) Appl. No.: 12/612,869

(22) Filed: Nov. 5, 2009

(65) Prior Publication Data

US 2010/0074101 A1  Mar. 25, 2010

Related U.S. Application Data

(63) Continuation of application No. PCT/CA2008/001043, filed on Jun. 2, 2008.

(60) Provisional application No. 60/941,430, filed on Jun. 1, 2007.

(51) Int. Cl.
*H04L 12/28* (2006.01)

(52) U.S. Cl.
USPC ........... 370/252; 370/216; 370/230; 370/233; 370/240

(58) Field of Classification Search
None
See application file for complete search history.

(56) References Cited

U.S. PATENT DOCUMENTS

| | | | |
|---|---|---|---|
| 6,430,150 B1 * | 8/2002 | Azuma et al. | 370/218 |
| 6,820,134 B1 | 11/2004 | Zinin et al. | |
| 6,895,441 B1 | 5/2005 | Shabtay et al. | |
| 7,650,426 B2 * | 1/2010 | Bamba | 709/238 |
| 2002/0141345 A1 * | 10/2002 | Szviatovszki et al. | 370/238 |
| 2002/0150099 A1 * | 10/2002 | Pung et al. | 370/390 |
| 2003/0099203 A1 | 5/2003 | Rajan et al. | |
| 2003/0179742 A1 | 9/2003 | Ogier et al. | |
| 2005/0018602 A1 * | 1/2005 | Labovitz | 370/229 |
| 2006/0045024 A1 | 3/2006 | Previdi et al. | |

(Continued)

FOREIGN PATENT DOCUMENTS

| | | |
|---|---|---|
| EP | 1087576 A2 | 3/2001 |
| EP | 1 093 262 | 4/2001 |
| WO | WO2007/041860 | 4/2007 |

OTHER PUBLICATIONS

Yang et al."GMPLS-Based Dynamic Provisioning and Traffic Engineering of High-Capacity Ethernet Circuits in Hybrid Optical/Packet Networks," Apr. 23-29, 2006.*

(Continued)

*Primary Examiner* — Kibrom T Hailu
*Assistant Examiner* — Zewdu A Beyen
(74) *Attorney, Agent, or Firm* — Withrow & Terranova, PLLC

(57) ABSTRACT

Connection constraints are flooded using an extension to a routing protocol being used to control forwarding on network. Nodes maintain topology and connection database and calculate routes for connections based on the constraints. If a node is on a calculated route for a connection it will install forwarding state for the connection. Since each node has a consistent view of the network topology and has been provided with the constraints associated with the connection, each node on the network will calculate the same route for the connection. When a failure occurs, the nodes will calculate restoration paths for the connections on a network-wide priority basis to enable restoration paths to be created for the affected connections without requiring the restoration paths to be signaled. Time-stamps are used to allow events to be applied by nodes in a consistent order regardless of the order in which they arrive.

17 Claims, 11 Drawing Sheets

(56) References Cited

U.S. PATENT DOCUMENTS

2007/0047469 A1* 3/2007 Vasseur et al. ............... 370/255
2007/0195715 A1* 8/2007 Yamano et al. ............... 370/254
2008/0123533 A1* 5/2008 Vasseur et al. ............... 370/238

OTHER PUBLICATIONS

International Preliminary Report on Patentability from corresponding PCT application PCT/CA2008/001043.
Written Opinion of the International Searching Authority from corresponding PCT application PCT/CA2008/001043.
Jacquet, P. et al. Optimized Link State Routing Protocol for Ad Hoc Networks: Multi Topic Conference, IEEE NMIC 2001, Technology for the 21$^{st}$ Century, Proceedings IEEE International, Dec. 28-30, 2001, pp. 1-7.
Alvarez, Santiago, "Chapter 2: MPLS TE Technology Overview," QoS for IP/MPLS Networks (book), Jun. 2, 2006, Cisco Press, http://ptgmedia.pearsoncmg.com/images/1587052334/samplechapter/1587052334content.pdf, pp. 57-77.
Extended European Search Report for European Application No. 08757179.0 issued Jul. 26, 2011, 11 pages.
Examination Report for European Patent Application No. 08757179.0, mailed Mar. 21, 2013, 6 pages.

* cited by examiner

DISTRIBUTED CONNECTION ESTABLISHMENT AND RESTORATION

CROSS-REFERENCE TO RELATED APPLICATIONS

This application claims priority to U.S. Provisional Patent Application No. 60/941,430, filed Jun. 1, 2007, entitled "Flooding Based Mechanism For Connection Creation With Absolute Priority Based Restoration", the content of which is hereby incorporated herein by reference. This application is a continuation of PCT application PCT/CA2008/001043, filed Jun. 2, 2008, the content of which is hereby incorporated herein by reference.

TECHNICAL FIELD

The present invention relates to networks and, more particularly to distributed connection establishment and restoration in a network such as a link state protocol controlled Ethernet network.

BACKGROUND

In Ethernet network architectures, devices connected to the network compete for the ability to use shared telecommunications paths at any given time. Where multiple bridges or nodes are used to interconnect network segments, multiple potential paths to the same destination often exist. The benefit of this architecture is that it provides path redundancy between bridges and permits capacity to be added to the network in the form of additional links. However to prevent loops from being formed, a spanning tree was generally used to restrict the manner in which traffic was broadcast on the network. Since routes were learned by broadcasting a frame and waiting for a response, and since both the request and response would follow the spanning tree, most if not all of the traffic would follow the links that were part of the spanning tree. This often led to over-utilization of the links that were on the spanning tree and non-utilization of the links that weren't part of the spanning tree.

To overcome some of the limitations inherent in Ethernet networks, a link state protocol controlled Ethernet network was disclosed in U.S. patent application Ser. No. 11/537,775, filed Oct. 2, 2006, entitled "Provider Link State Bridging," the content of which is hereby incorporated herein by reference. As described in greater detail in that application, the nodes in a link state protocol controlled Ethernet network exchange link state advertisements to build a synchronized view of the network topology, which is stored in a link state database. The link state database may then be used to compute shortest paths through the network. The link state advertisements may be used to distribute link state updates to all other nodes in a particular network level.

In addition to building a network topology database, each node also populates a Forwarding Information Base (FIB) which will be used by the node to make forwarding decisions so that frames will be forwarded over the computed shortest path to the destination. Since the shortest path to a particular destination is always used, the network traffic will be distributed across a larger number of links and follow a more optimal path for a larger number of nodes than where a single Spanning Tree or even multiple spanning trees are used to carry traffic on the network.

When customer traffic enters a provider network, the customer MAC Destination Address (C-MAC DA) is resolved to a provider MAC Destination Address (B-MAC DA), so that the provider may forward traffic on the provider network using the provider MAC address space. Additionally, the network elements on the provider network are configured to forward traffic based on Virtual LAN ID (VID) so that different frames addressed to the same destination address but having different VIDs may be forwarded over different paths through the network. In operation, a link state protocol controlled Ethernet network may associate one VID range with shortest path forwarding, such that unicast and multicast traffic may be forwarded using a VID from that range, and traffic engineering paths may be created across the network on paths other than the shortest path, and forwarded using a second VID range. The use of Traffic Engineered (TE) paths through a link state protocol controlled Ethernet network is described in greater detail in U.S. patent application Ser. No. 11/732,381, filed Apr. 3, 2007, entitled "Engineered Paths In A Link State Protocol Controlled Ethernet Network", the content of which is hereby incorporated herein by reference.

The Institute of Electrical and Electronics Engineers (IEEE) has developed a draft standard 802.1Qay which is commonly referred to as Provider Backbone Bridging-Traffic Engineering (PBB-TE). Conventionally, when a PBB-TE network is to be used to transport IP traffic, a connection would be set up across the PBB-TE network. One way to set up a connection across a PBB-TE network is described in U.S. patent application Ser. No. 11/580,796, filed Apr. 19, 2007, entitled "GMPLS control of Ethernet" the content of which is hereby incorporated herein by reference.

As described in greater detail in this application, when a connection is to be established across a PBB-TE network, the connection will be computed by a head-end node or central management system, and then a connection set up message will be transmitted across the PBB-TE network. For example, assume that Node A was asked to establish a connection to node E. Node A would perform a path computation process to figure out a path to E which, for purposes of this example will be assumed to include intermediate nodes B, C, and D.

Node A will then create a RSVP-TE path setup message containing information about the path through the network and send the path setup message to node B. Node B will process the message and pass it to node C. The message will continue until it reaches its destination (node E).

When node E receives the path setup message, it will generate a RSVP-TE resv response message which will follow the reverse path through the network. As part of this RSVP-TE signaling, the nodes on the path reserve resources and install forwarding state to allow traffic to be forwarded along the path.

In U.S. patent application Ser. No. 11/525,594, filed Mar. 22, 2006, entitled Method and Apparatus For Establishing Forwarding State Using Path State Advertisements, a proposal was made to use the link state protocol control packets to carry this connection information on the network rather than using a separate signaling protocol. In this application, the head-end node would calculate a path through the network using network topology information in its topology database. Rather than signaling these connections on the network using RSVP-TE, however, the link state protocol such as ISIS was extended to carry the connection information in particular its path through the network. In this scenario, the head-end node calculates a route and floods the route throughout the network. All nodes on the network store the connection in their connection database. Nodes on the connection's route install forwarding state for the connection to thereby allow the connection to be created on the PBB-TE network. The content of application Ser. No. 11/525,594 is hereby incorporated herein by reference.

A PBB-TE network may include many connections, each of which is carried on a traffic engineered path that is signaled on the network. When a failure occurs on the network, the head-end nodes for those connections affected by the failure will re-compute new routes for the connections and flood the new routes in link state advertisements. The head-end nodes will compute these routes given the new network topology and the constraints associated with the routes such as required bandwidth, desired end node, and relative priority of the connection. Since there are many different head-end nodes that may be affected by a given failure on the network, and each head-end node is responsible for computing a new set of routes for its affected connections, it is possible for clashes to occur in which two different head-end nodes both try to reserve resources for restoration paths for different connections over a given node/link. Additionally, while each of the nodes may prioritize its own connections, coordinating priority of connections established by different nodes on the network remains a challenge. Accordingly, it would be advantageous to provide a new way for connections to be re-established after the occurrence of a failure on the network.

SUMMARY OF THE INVENTION

Rather than having a head-end node calculate an explicit path through the network for a connection, the head-end node instead advertises a set of connection constraints, such as the bandwidth required for the connection, the pair of ingress/egress nodes for the connection, and the connection priority. The connection constraints are flooded on the network using an extension to the routing protocol being used to control forwarding on the network.

The network may be a packet network, a link state protocol controlled Ethernet network, or another network. When a node on the network receives a control packet (TLV) containing connection constraint information, the node will store the connection constraints in its connection database and calculate the route through the network for the connection based on the current network topology and the received constraints, to determine whether it is on a route for that connection. The computed route for the connection will also be ranked relative to the other connections based on the priority information and stored by the node in the connection database. If the node is on the calculated route for that connection, the node will install forwarding state for the DA/VID associated with the connection into its forwarding information base. Each node on the network performs this same process. If each node has a consistent view of the network topology and has been provided with the constraints associated with the connection, each node on the network will calculate the same route for the connection. Thus, the connection's forwarding states will line up end-to-end across the network.

When a failure occurs on the network, the failure will be advertised to all nodes on the network. Upon receipt of a failure indication, the nodes will look into their connection database to determine which connections are affected by the failure. Each node will re-compute a new route (restoration path) for each affected connection and store the updated route information in its connection database. Connections are processed by the nodes in order of priority to thereby enable a network-wide connection prioritization to be implemented for restoration routes. Nodes will then install/remove forwarding state based on the new calculated routes. Specifically, if a node was previously on a route for a connection and is no longer on the route for the restoration path, the node will remove forwarding state for the connection from its forwarding information base. Conversely, if a node was not previously on a route for a connection and is on the route for the restoration path, the node will install forwarding state for the connection into its forwarding information base. If the nodes all have a consistent view of the network, and compute restoration paths for failure affected connections in the same order, then the restoration paths for the connections will also line up end-to-end across the network. Additionally, restoration paths are created without requiring explicit signaling for the connections.

Having nodes on the network compute routes for connections based on constraint information works well if all nodes on the network have a consistent view of the network topology. A scenario may occur where more than one failure occurs on the network. Since nodes may start re-computing routes for connections upon receipt of the first failure notification, the order of receipt of the failure notifications may affect how nodes compute routes through the network. Accordingly, event notifications such as failure notifications and connection requests may be time-stamped to allow nodes to process the event notifications in a consistent manner. To accommodate out-of-order arrival of time-stamped event notifications, each node will maintain a reference network view of the network connections so that the nodes can revert back to the previous network state and apply the event notifications in a consistent sequence regardless of the order in which they are received.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

A link state protocol flooding mechanism may be used to add and delete connections on a network such as an Internet Protocol (IP) or link state protocol controlled Ethernet network. The flooding mechanism allows constraints defining the connections to be flooded so that each node on the network can independently calculate a route for the connection.

Embodiments of the invention may be used in many different types of networks and, although an example of an implementation will be described below in connection with a link state protocol controlled Ethernet network, the invention is not limited to implementation in a network of this nature. Rather, the following description is intended to provide an example of a particular implementation. The invention may be practiced in connection with other networks as well. For example, an embodiment of the invention may be implemented in a packet based network such as an Internet Protocol (IP) based network.

According to an embodiment of the invention, the link state protocol flooding mechanism is used to flood constraints associated with the connections such as the ingress/egress node pair, the amount of bandwidth required for the connection, and the connection priority. The nodes on the network use the constraints to individually calculate routes for the connections and will install forwarding state for the connection if they are on a route for a connection. Since the nodes know the constraints associated with the connections, upon failure on the network the nodes may all independently calculate restoration routes for the connections without requiring a flooding mechanism to be used to re-establish connections upon occurrence of a failure. Thus, connections can be re-established automatically by the nodes without requiring the connections to be re-signaled on the network. Since the constraint information includes the priority of the connection, each node has a list of all connections and knows the priority of each of the connections. This enables each node to process the connections in priority order when computing restoration paths for the connections to thereby enable a network-wide prioritization of connections upon restoration.

Figure 1:
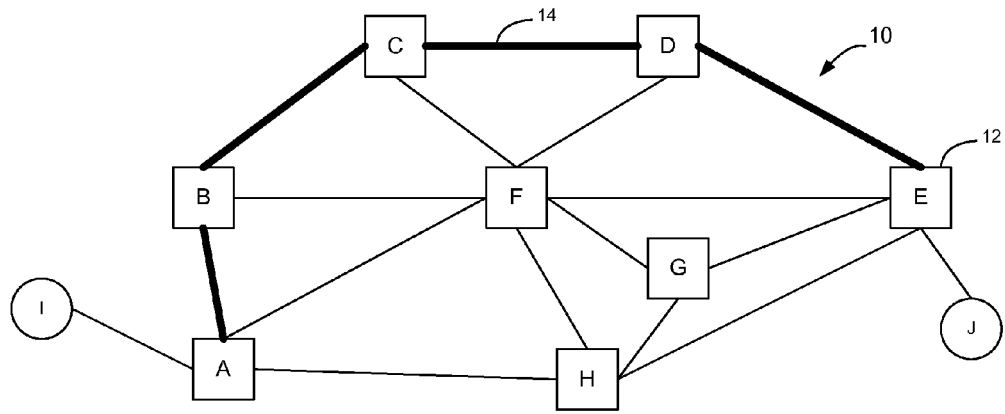
FIG. 1 is a schematic representation of a mesh network that may be used to implement a network such as a link state protocol controlled Ethernet network.

FIG. 1 shows an example network which, for example, may be implemented as a link state protocol controlled network 10 including a plurality of nodes 12 interconnected by links 14. In FIG. 1, a connection (dark line) has been established from customer I to customer J through nodes A, B, C, D, and E. The connection has constraints associated with it, such as the ingress node A and the egress node E. Additionally, the connection may specify an amount of bandwidth that should be reserved, quality of service, and other types of constraints that specify the type of service to be provided by the connection. The connection is also assigned a priority level. When node A receives a connection request from customer I, it will determine the constraints associated with the request and flood the constraints in a link state advertisement onto the link state protocol controlled network 10. The nodes will use the constraints to independently calculate the exact same route for the connection and install forwarding state to establish the connection on the network.

Figure 2:
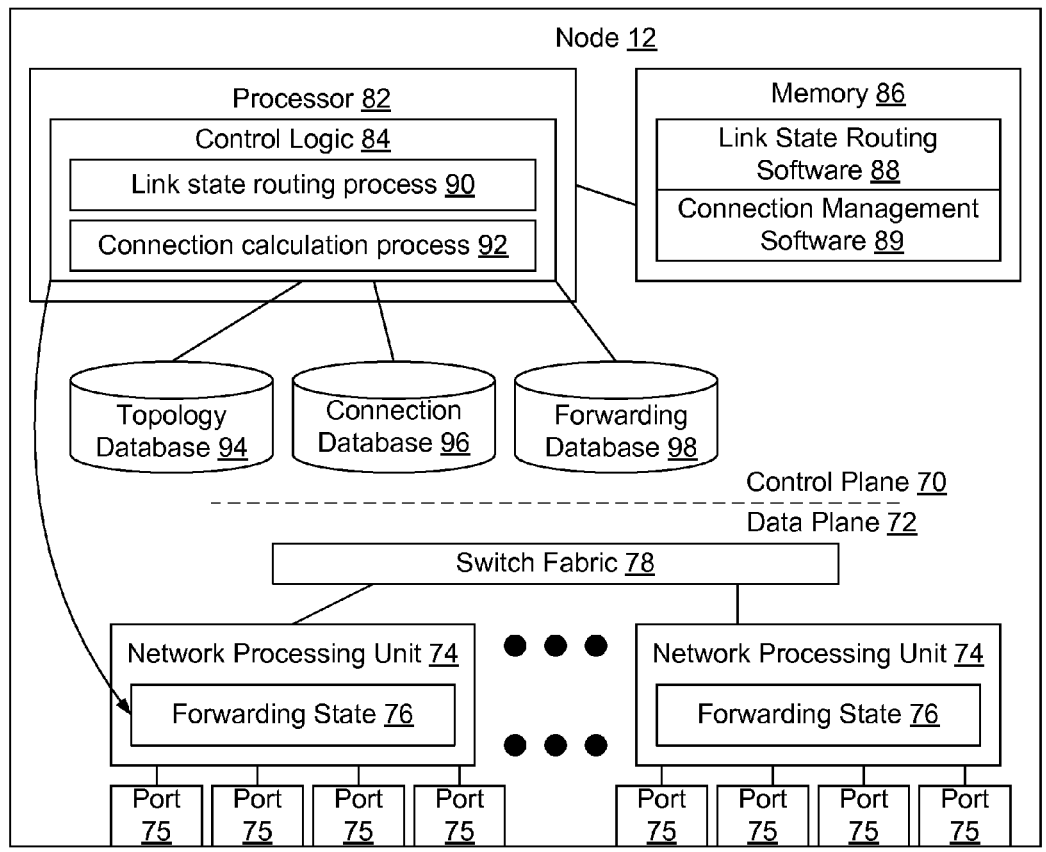
FIG. 2 is a schematic representation of a network such as a link state protocol controlled Ethernet network element.

FIG. 2 shows an example network element that may be used to implement a node 12 in the network of FIG. 1. As shown in FIG. 2, the node includes a control plane 70 and a data plane 72. The data plane is configured to handle data on the network, and includes network processing units 74 containing forwarding state 76 that is installed into the forwarding plane by the data plane. A switch fabric 78 interconnects the network processors to enable data received at one port 75 associated with one network processing unit 74 to be output at another port connected to the same network processing unit or connected to a different network processing unit.

The control plane 70 includes one or more processors 82 containing control logic 84. The control plane also contains a memory 86 containing data and instructions that may be loaded into the control logic 84 of the processor 82 to configure the processor to perform the operations described herein. For example, the memory 86 may contain link state routing software 88 to enable the node to transmit and receive routing protocol control packets. The memory 86 may also contain connection management software 89.

A link state routing protocol such as ISIS uses control packets, the format of which may contain a particular Type Length Value (TLV). The TLVs specify the fields and format of the control packet so that a node, when it receives a control packet, is able to discern what information is contained in the control packet. As discussed in greater detail herein, according to an embodiment of the invention the nodes on the network flood constraint information associated with connections to be established on the network. To enable the nodes to extract the constraint information from the control packets a new TLV may be created that specifies fields that may be used by the nodes to exchange this type of information. The particular fields that may be specified in the TLV will depend on the type of constraint information to be flooded and may include, for example, connection ID, bandwidth, start node, end node, priority, and any other information that may be helpful to the nodes when computing the route for the connection.

Two examples of link state routing protocols include Open Shortest Path First (OSPF) and Intermediate System to Intermediate System (IS-IS), although other link state routing protocols may be used as well. IS-IS is described, for example, in ISO 10589, and IETF RFC 1195, the content of each of which is hereby incorporated herein by reference. Although there are current versions of this protocol, standards evolve over time and the concepts described herein may be adapted to work with future versions of the standard as they are developed. Similarly, the invention is not limited to an implementation that operates in connection with one of these particular protocols as other protocols may be used to exchange routing information as well.

When the data and instructions are loaded from the memory into the processor, the processor will implement a link state routing process 90 to enable the node to participate in normal link state routing exchanges on the network and to receive constraint information about connections to be established on the network. The processor may also implement a connection calculation process 92 which may be separate from the routing process or may be integrated with the routing process. The connection calculation process performs the functions associated with calculating constrained routes for connections and maintaining the connection database as described in greater detail herein.

Figure 13:
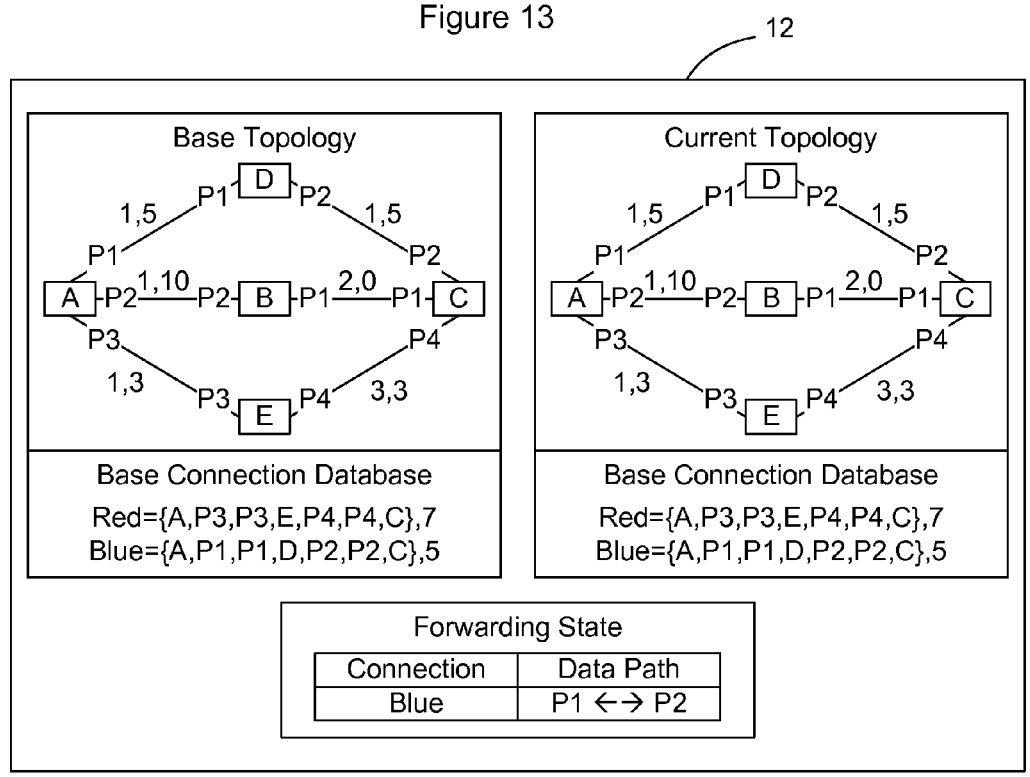
FIG. 13 is a functional block diagram showing a node having two topology databases and connection databases.

The node shown in FIG. 2 includes one or more databases that store information for use by the routing process and/or connection calculation process. For example, the node may include a topology database 94 containing the current topology database and one or more previous versions of the topology database. For example, FIG. 13 shows an example node 12 which has stored more than one topology database (a base topology and a current topology). The node may also include a connection database 96, which may be a separate database from the topology database or formed as a part of the topology database. The node optionally may contain a forwarding database containing an image of the forwarding state that has been programmed as forwarding state 76 into the data plane 72. Other node configurations may be used as well and the node configuration shown in FIG. 2 is intended merely to provide an example functional description of how a node may be architected.

As connections are to be created on the network, the constraints associated with the connection will be flooded to all the nodes. The nodes will store the constraints in their connection database and calculate a route for the connection. If the nodes on the network are on the route for the connection, they will install forwarding state for the connection. If a node is not on the route, it will not install forwarding state.

Since multiple connections may compete for limited resources, each connection will be ranked and given a priority value. Every node ranks connections according to their priority such that a given set of connections will be ranked consistently by all nodes on the network. If two or more connections have the same priority, then a tie-breaking rule is applied to determine which connection should have priority. For example, the MAC address of the head-end node on the connection may be used to prioritize connections. Where two connections with equal priority are flooded by the same head-end node, the order of creation or order within the flood message may be used to determine the relative priority of the connections. Nodes maintain the priority information so that all nodes on the network rank the connections in the same manner.

Upon occurrence of a failure in the network, the nodes on the network will calculate restoration paths for the connections. The nodes will determine which of the connections are affected by the failure and process the connections in priority order. This allows the nodes on the network to calculate routes for the higher priority connections first before other lower priority connections are processed. Since the nodes process connections according to priority, the restorations are prioritized on a network-wide basis. By contrast, where head-end nodes computed routes and signaled the routes onto the network, network-wide restoration prioritization was not available since the head-end nodes could do at best local (nodal) prioritization rather than global (network-wide) prioritization.

In steady state operation, each node will have a consistent view of the network topology and will have a consistent view of connections that have been established on the network. The connections will also be prioritized consistently by the nodes. When a new connection is to be established, the constraints associated with the connection will be flooded to the nodes on the network. The nodes will each calculate a route for the connection based on the current topology and connection constraints. The nodes on the route will then install forwarding state if they determine that they are on the route for the connection. Since each node is performing the same calculation based on the same starting data, each node will calculate the same route for the connection so that the route will line up end-to-end across the network for the connection. The nodes will also determine the priority of the connection and store the connection in their connection database.

Upon occurrence of a fault on the network, a failure notification will be flooded on the network. Each node will determine which connections are affected by the fault and return the bandwidth associated with the affected connections back to the topology database. For every affected connection, starting with the highest priority connection, the node will then calculate a new restoration route based on its present view of the network topology. If the node is on the restoration route, the node will uninstall any existing forwarding state for the connection and then install the necessary forwarding state for the connection. If the node is not on the restoration route, the node will uninstall any existing forwarding state for the connection. Since all nodes have a consistent view of the network topology and have the connections ranked consistently, all nodes will compute the same set of restoration paths. Thus, it is not necessary to flood restoration routes upon occurrence of a failure on the network.

Figure 3:
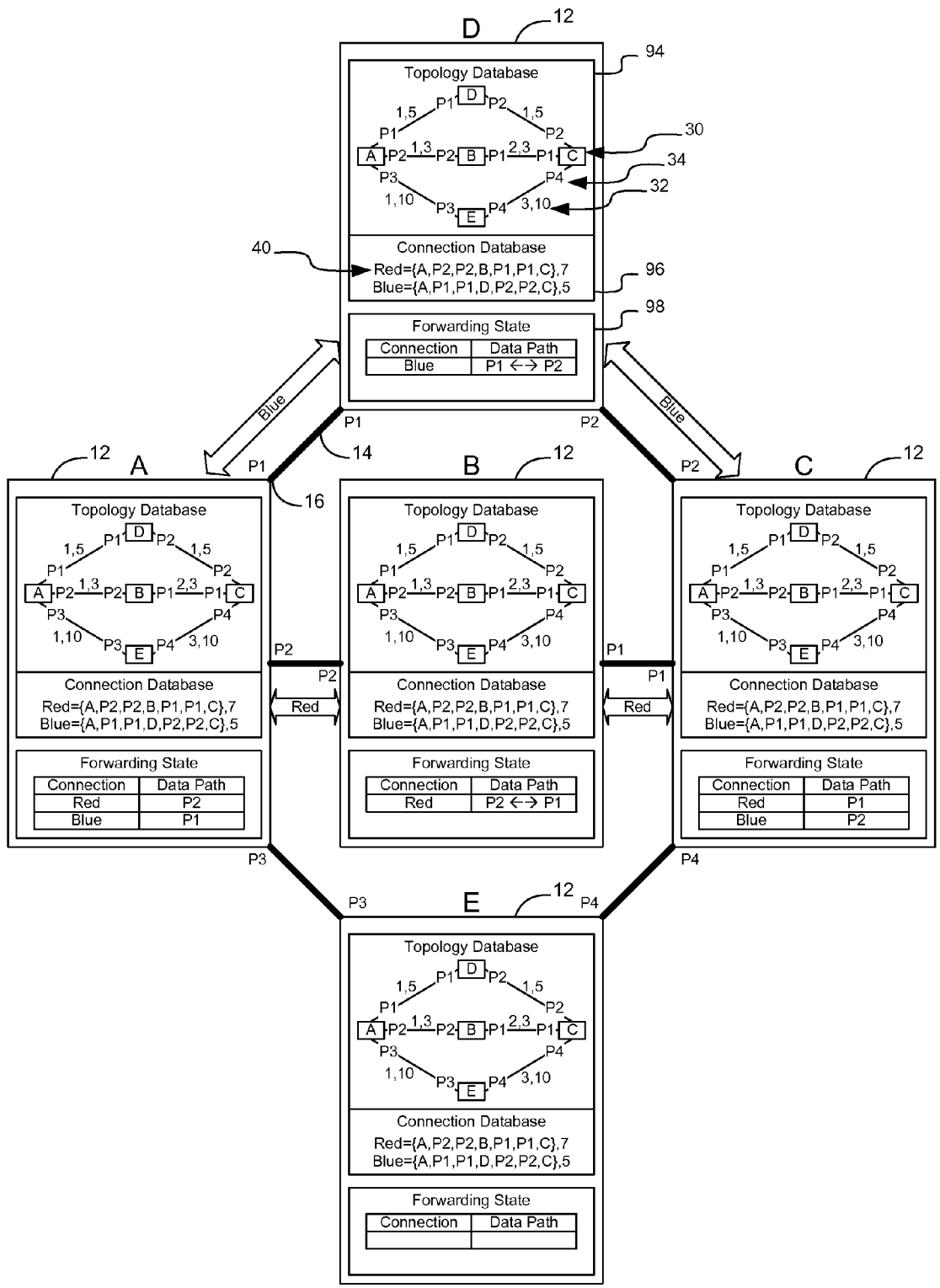
FIGS. 3-8 are network diagrams of an example network, which show several possible tables that may be maintained by nodes on the network, and show how the tables change upon occurrence of a failure on the network.

FIGS. 3-8 show an example of how this might be implemented in an example network. As shown in FIG. 3, it will be assumed for sake of explanation that the example network has five nodes 12, labeled nodes A-E. The nodes are interconnected by links 14.

Each node 12 has a topology database 94 containing a synchronized view of the network topology. For example referring to the topology database 20 of node D, the topology database contains an entry 30 describing each node 12. Similarly, the topology database also includes a topology entry 32 describing each of the links 14. The two numerals associated with the topology entries describe the link cost and the amount of remaining available bandwidth on the link. Thus, a link entry of 1,5 would indicate that the link has a cost of 1 and an available bandwidth of 5. Similarly a link entry of 3,10 would indicate that the cost of the link is 3 and the available bandwidth on that link is 10. As connections are added the amount of available bandwidth is adjusted to reflect the updated available bandwidth on the links.

The nodes A-E on the network each contain ports 16 that connect to the links 14. The topology database similarly contains an entry 34 describing which port is connected to which link. In the illustrated example the topology database has been shown as a network graph. In operation, the topology database contains entries describing the information. Thus, the network elements may not actually contain a miniature graphical representation of the network but rather contain a database of information that describes the network. Applicants have shown the topology database in a graphical manner to help explain how portions of the entries in the database change over time as events occur on the network to reflect the updated status of the network. In operation, however, a real network element would include a conventional database with data entries for the various aspects of the network described herein and shown in the diagram of the topology database 94 of FIG. 3.

The nodes A-E also include a connection database 96. The connection database may be part of the topology database or may be separate from the topology database. As connections are to be added to the network, the constraints associated with each connection will be flooded to the nodes on the network. Each node will store the constraints in the connection database and also attach a priority to the connection. This priority will also be stored by the node in the connection database. Optionally, the order in which the connections are stored in the connection database may be used to identify the relative priority of the connections.

Based on the constraints, such as the ingress/egress nodes and the required bandwidth, each node on the network will calculate a route for the connection. Since each node has a consistent view of the network topology and has a consistent view of the other connections that have been established on the network, the nodes will all calculate the same route for the connection. The nodes will then store the route information for the connection in their connection database.

In the example shown in FIG. 3, the connection database includes route entries 40. Each route entry contains a route identifier, i.e. Red, Blue, a list of nodes/ports, and the amount of bandwidth that has been requested/reserved for the route. Thus, a route entry such as Red={A,P2,P2,B,P1,P1,C},7 would indicate that the Red route starts at node A, exits node A at port P2, is received at port P2 at node B, exits node B via Port P1, and arrives at node C on port P1. This entry also indicates that the connection has requested/reserved 7 units of bandwidth. FIG. 3 shows the state of the example network before occurrence of a failure.

Figure 4:
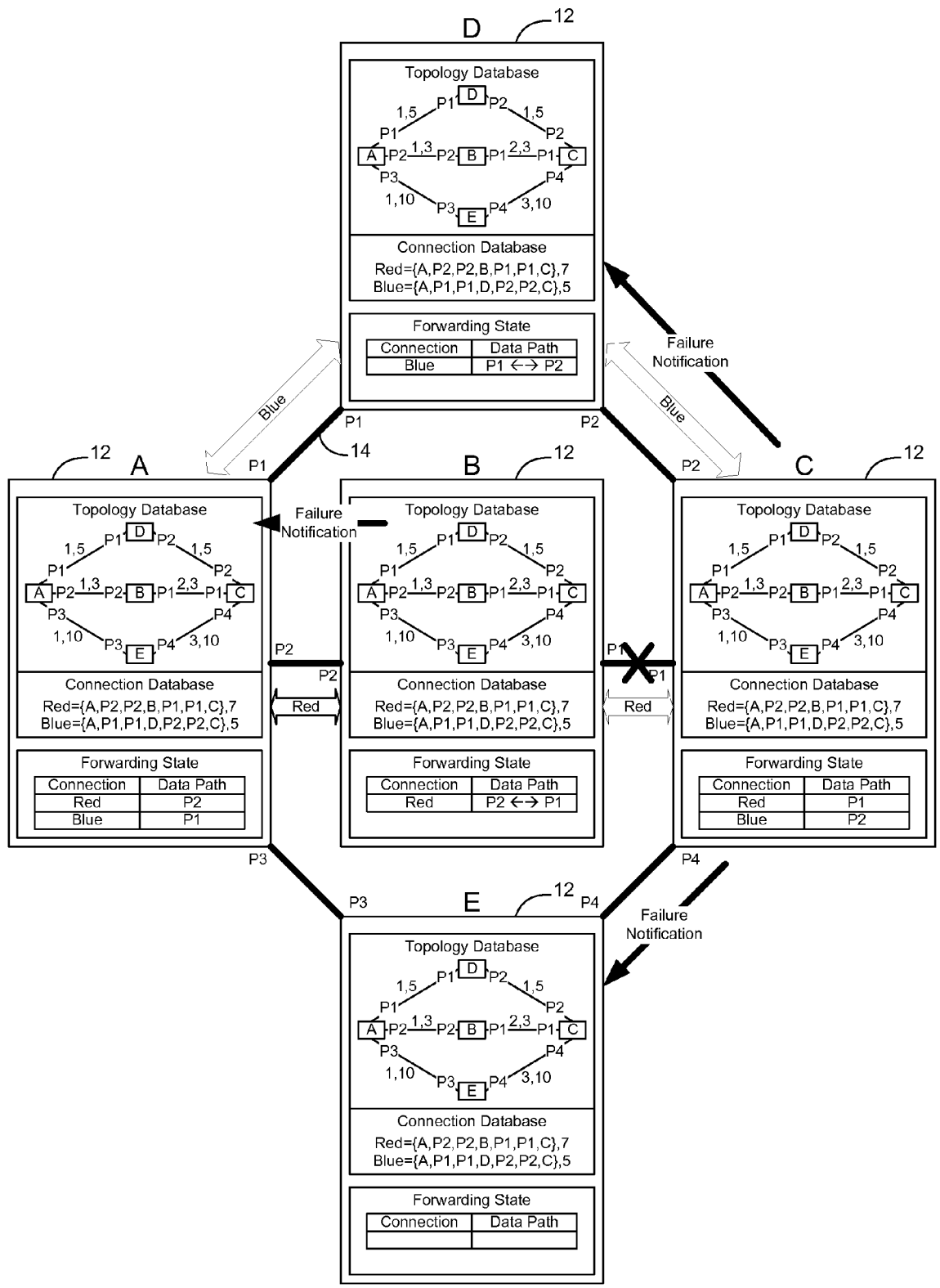

FIG. 4 shows the initial state of the network when a failure occurs. Assume, in this example, that a link failure occurs on the link between nodes B and C. When the failure is sensed, each of the nodes B and C will send out a failure notification to the rest of the network. The failure notification will be flooded by both nodes B and C. Each node will time stamp the failure notification for reasons discussed in greater detail below. When the nodes receive the failure notifications they will apply the failure notifications in the order indicated by the time stamps, so that each node applies the failure notifications in the same order. In the example shown in FIG. 4, it has been assumed that the failure was a bi-directional failure. Where the failure was only in one direction, only one of the nodes B and C would send out a failure notification.

Figure 5:
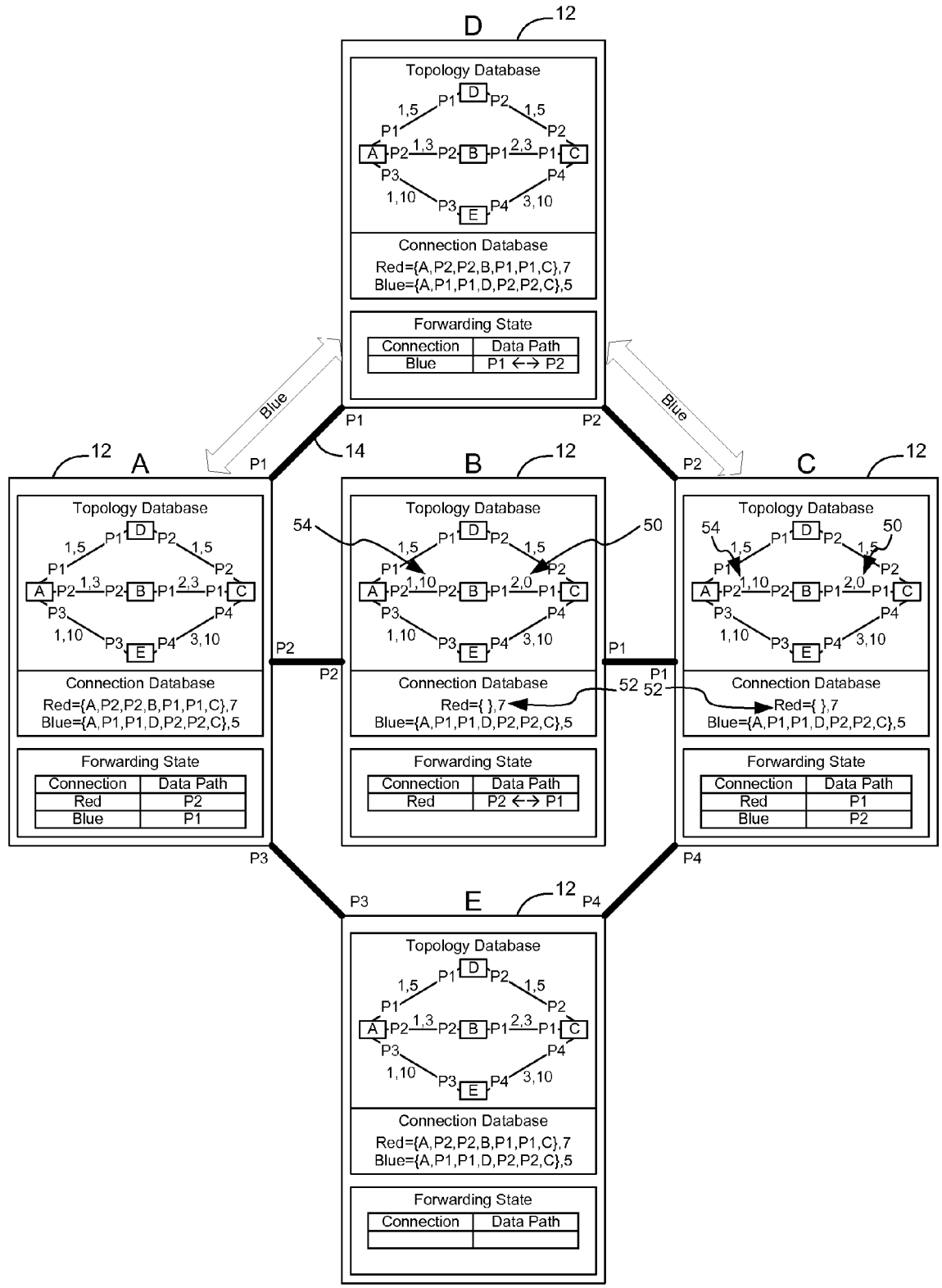

FIG. 5 shows how the nodes on the network begin to update their topology database after a failure. In the example shown in FIG. 5, nodes B and C have detected the failure and have updated their corresponding topology databases. The other nodes on the network have not yet received the failure notifications flooded by B and C. Thus, the topology databases of nodes A, D, and E are the same in FIG. 5 as they were in FIGS. 3 and 4.

As shown in FIG. 5, when nodes B and C detect a failure they will change the available bandwidth of the link connecting nodes B and C to zero. Specifically, since the link between nodes B and C has failed, the link is not available to carry traffic. Thus, the available bandwidth entry 50 for this link has been set to zero. The nodes will also determine which connections are affected by the link failure. In this example, nodes B and C will determine that the Red connection is affected and will delete the route information for the Red connection 52 from the connection database. After identifying the connections that are affected, the nodes will also release the bandwidth occupied by the affected connections and return that bandwidth to the topology database. In the example shown in FIG. 5, the Red connection was previously routed over the link between nodes A and B. Accordingly, the entry 54 for this link in the topology database will be updated to include the released bandwidth from the Red connection. Since the Red connection was occupying 7 units of bandwidth, the available bandwidth for this link has been increased from 3 to 10.

Figure 6:
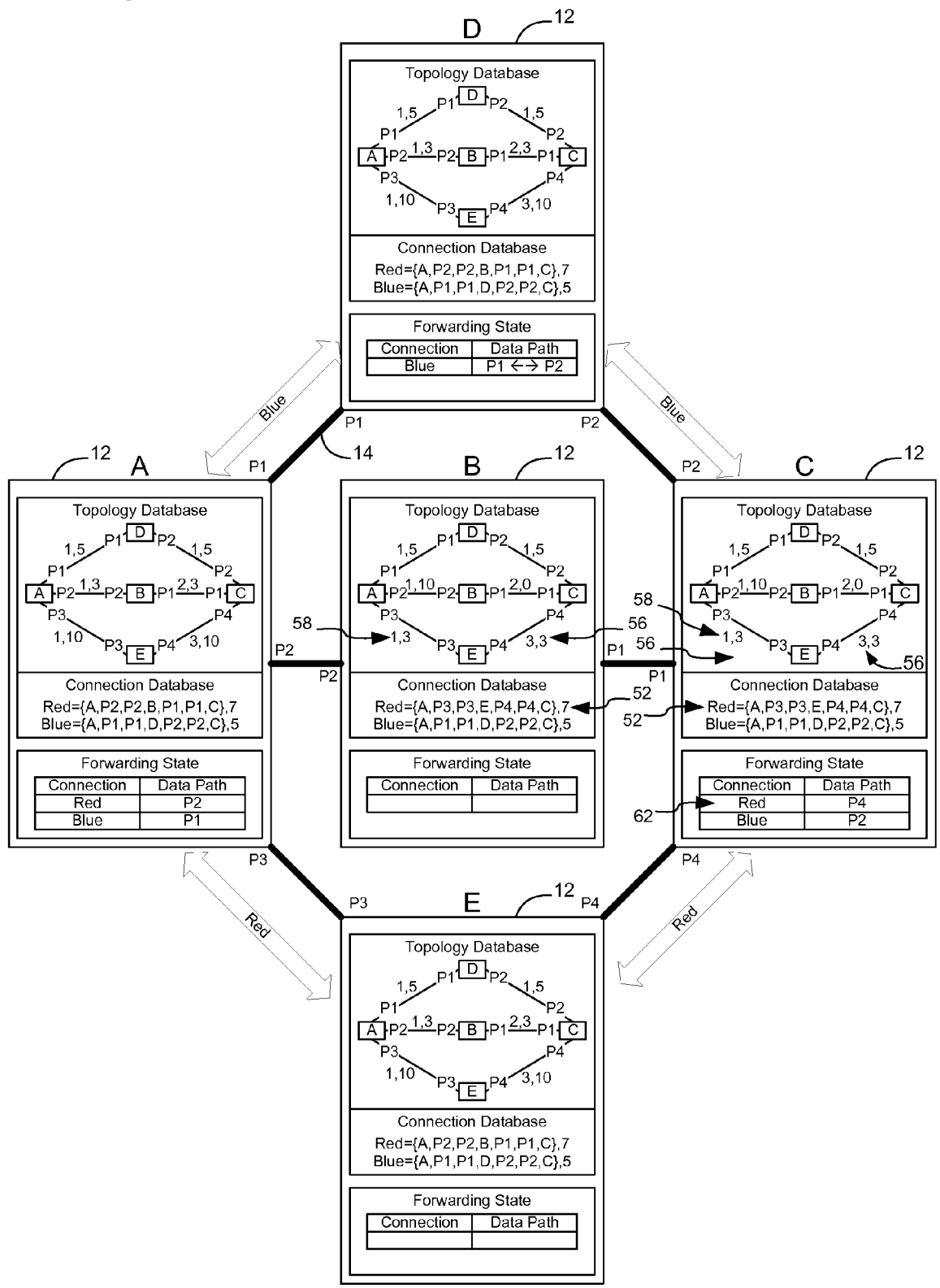

Once the nodes have deleted the old route information for the affected connections and returned the bandwidth associated with the affected connections to the topology database, the nodes will start to compute restoration routes for the affected connections. In the example shown in FIG. 6, the computed restoration route for the Red connection is from A to E and then to C. The connection entry 52 for the Red connection will be modified to include this new route information. For example, as shown in FIG. 6, the new route for the Red connection 52 has been computed as {A,P3,P3,E,P4,P4,C}. Both nodes B and C have computed the same route for the Red connection, and both have included that route in their connection database.

When a route has been calculated for a connection, the bandwidth occupied by the connection will be reflected in the topology database. Thus, as shown in FIG. 6, since the Red connection requires 7 units of bandwidth, the entries for the available bandwidth on the link 56 from node A to node E and the link 58 from node E to node C have been reduced by 7 units in FIG. 6.

The nodes will then proceed to uninstall forwarding state, or install forwarding state, depending on whether they are on the restoration route. In FIG. 6 node B was on the original route for the Red connection, but the restoration route does not include node B. Thus, node B will remove the forwarding state for the Red connection. Node C, by contrast, was on both the original route and the restoration route. However, the restoration route passes over a different port at node C. Thus, node C will either delete the old connection from the forwarding information base and install new forwarding state, or will change the existing forwarding state for the Red connection to reflect the new forwarding state 62.

As mentioned above, the nodes adjacent the failure will detect the failure and flood a failure notification to the other nodes on the network. The nodes adjacent the failure will then undergo the process described above in connection with FIGS. 3-6 to update their topology database and connection database to remove the route information for the affected connections and install route information for the restoration paths for the affected connections.

The other nodes on the network will undertake this same process upon receipt of the failure notification flooded by nodes B and C. Since the failure notification will take a finite amount of time to propagate thorough the network, different nodes may undertake this process at different times and be somewhat out of sync with each other while the processing is occurring. To prevent this from creating loops on the network, a process such as Reverse Path Forwarding Check (RPFC) may be performed to prevent packets that arrive at an unexpected port from being forwarded on the network.

Figure 7:
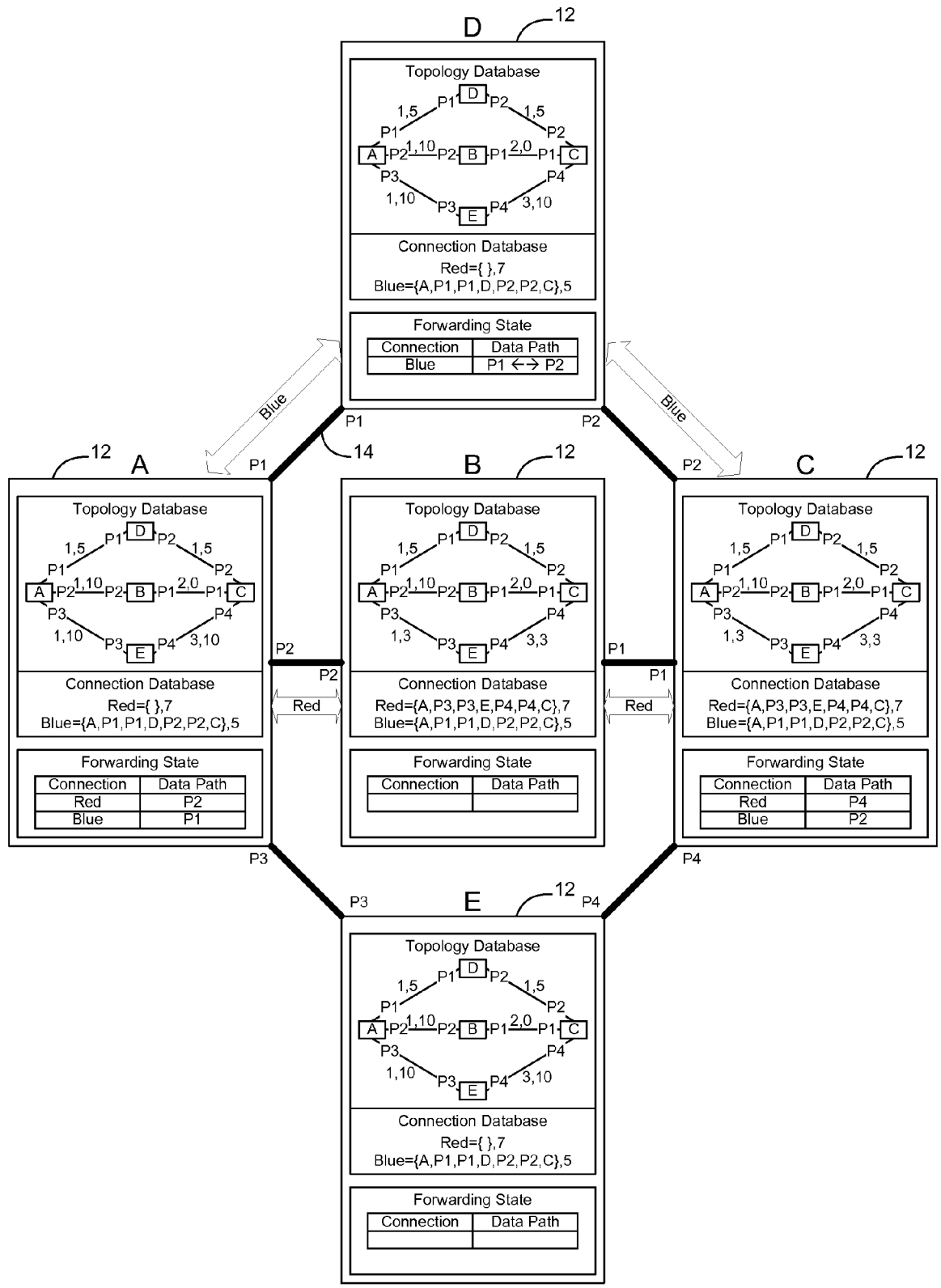

FIG. 7 shows the processes undertaken by nodes A, D, and E upon receipt of the failure notification. In the example shown in FIG. 7, it has been assumed that nodes A, D, and E would just be receiving the failure notification when nodes B and C have already completed updating their topology database, etc. As shown in FIG. 7, node C has installed forwarding state for the Red connection to output data for the Red connection on port P4 to node E. Node E, however, does not have forwarding state installed for the Red connection. Thus, node E will drop packets received from node C on the Red connection. Node E may also implement RPFC to determine whether it is receiving Red packets on the correct port. Since it will take a finite amount of time to flood notifications on the network, and each node is required to use a consistent view of the network when calculating routes, the use of time stamps to account for these processing delays and to account for the potential for different failure notifications to arrive at different times will be described in greater detail below.

FIG. 7 shows the state of the nodes A, D, and E upon receipt of the failure notification. As shown in FIG. 7, the nodes will first determine which connections are affected by the failure and will remove the route information for those connections from the connection database. The bandwidth associated with the connection will also be returned to the topology database so that it is available when the nodes calculate restoration paths for the affected routes.

Figure 8:
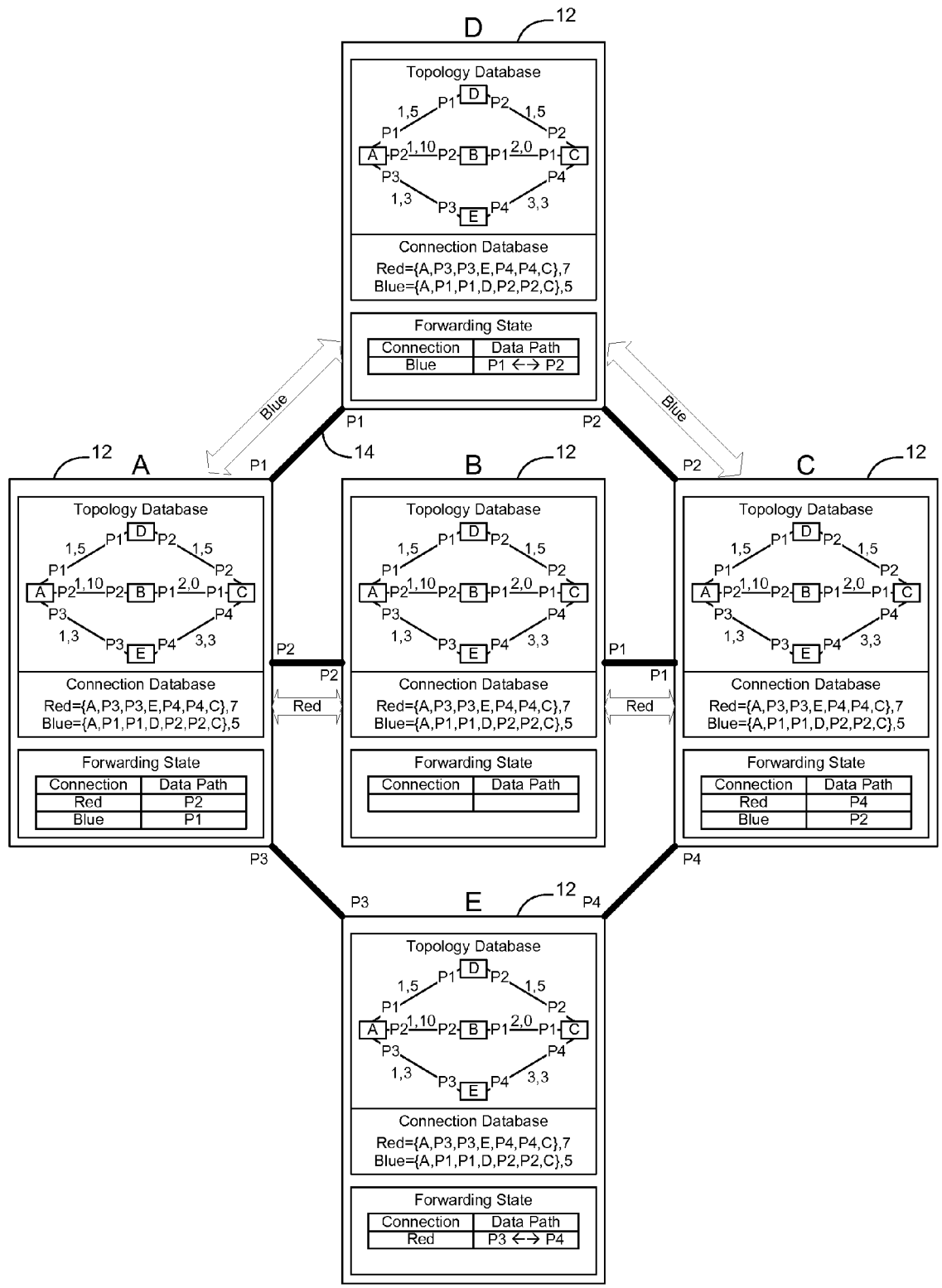

FIG. 8 shows the next portion of the process, in which the nodes calculate new restoration routes for each of the affected connections, update the topology database to reflect the bandwidth allocated to the restoration routes, and update the forwarding state to enable the nodes to handle traffic on the restoration routes.

Specifically, as shown in FIG. 8, each of the nodes A, D, and E will calculate the new route for the Red connection as Red={A,P3,P3,E,P4,P4,C} and store that route in their connection database. The nodes will also update their topology databases to update the available bandwidth on the links over which the Red connection has been routed. Thus, the amount of bandwidth available on the link between nodes A-E and between nodes E-C has been decremented by the amount of bandwidth allocated to the Red connection.

Finally, the nodes will install forwarding state to enable the restoration route to be implemented on the network. Where the nodes previously had forwarding state installed for the original connection, that forwarding state will be deleted or modified, as necessary, to reflect the restoration route for the connection.

As described above, when a connection is to be established on the network, the initiating node will flood constraints associated with the connection onto the network. This allows the nodes to each calculate a route for the connection and selectively install forwarding state if on the route for the connection so that the connection lines up end-to-end across the network. Upon detection of a failure, the only flood that needs to occur is the flood notifying the network elements of the occurrence of the failure. The nodes may use the failure notification flood along with the connection information stored in their connection database to determine which connections are affected by the failure and to re-calculate restoration routes for each affected connection. Once again, if the nodes are all operating with a consistent view of the network topology and a consistent view of the connections, each node will perform the same set of calculations in the same order to arrive at the same set of restoration routes for the connections affected by the failure. Thus, the restoration routes, like the original routes, will line up end-to-end across the network. Accordingly, connections may be restored without requiring new connection routes to be flooded on the network.

Moreover, since the restorations are implemented by processing the connections in order of priority, clashes between competing connections will not occur which was a possibility where the restoration paths were being calculated by the head-end nodes and flooded on the network. Additionally, by causing the nodes to determine restoration paths for calculations based on order of priority, a network wide restoration prioritization is achieved.

As shown in connection with FIGS. 3-8, topology change notifications take a finite amount of time to propagate on the network. Where a single failure occurs on the network, as illustrated in FIGS. 3-8, the number of topology change notifications to be applied may not be significant. However, where conditions are deteriorating rapidly and multiple failures are occurring, there may be several topology change notifications sent out rapidly. Additionally, the topology change notifications may relate to recoveries as well as failures on the network. Moreover, there may be connection additions and/or deletions occurring while one or more failures and/or recoveries are occurring on the network. Thus, the order in which the topology change notifications are received and processed may affect the manner in which routes for connections are calculated by the nodes on the network.

According to an embodiment of the invention, each topology change notification is time-stamped by the network node that generates the topology change notification. Nodes on the network apply the topology changes in chronological order according to the time stamps. Since each node applies the same topology change notifications in the same order, it doesn't matter what order they are received by that node. Stated differently, each node will rearrange the topology change notifications according to the time-stamps so that they are able to be applied by the node in chronological order.

According to an embodiment of the invention, all events are time-stamped so that the events may be ordered by the nodes prior to being processed against the topology database, connection database, and forwarding state. These events include link failure, link recovery connection addition, connection deletion as well as other events which affect the topology of the network. Each such event is time-stamped by the node which originates the flood for the event.

To enable the nodes to ensure that they are applying the topology updates (failure notifications and recovery notifications) as well as connection requests and deletions in the correct order, the node maintains a time-stamp for its topology. When a node having a topology with a time-stamp of Ti learns of an event with a time-stamp Tj that indicates that the event occurred at a later point in time, j>i, the node will apply the event with time-stamp Tj and update the topology time-stamp to Tj. The node will also store a copy of the event Tj.

Figure 10:
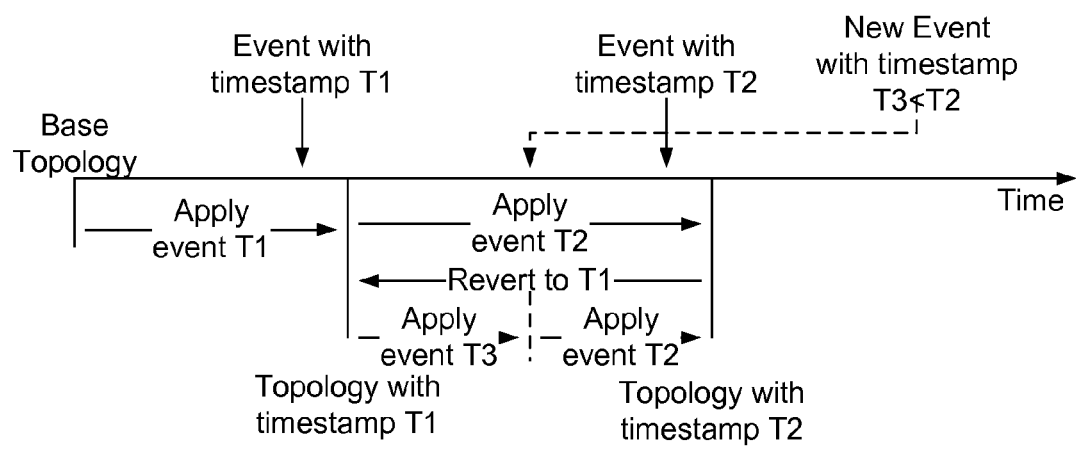
Figure 11:
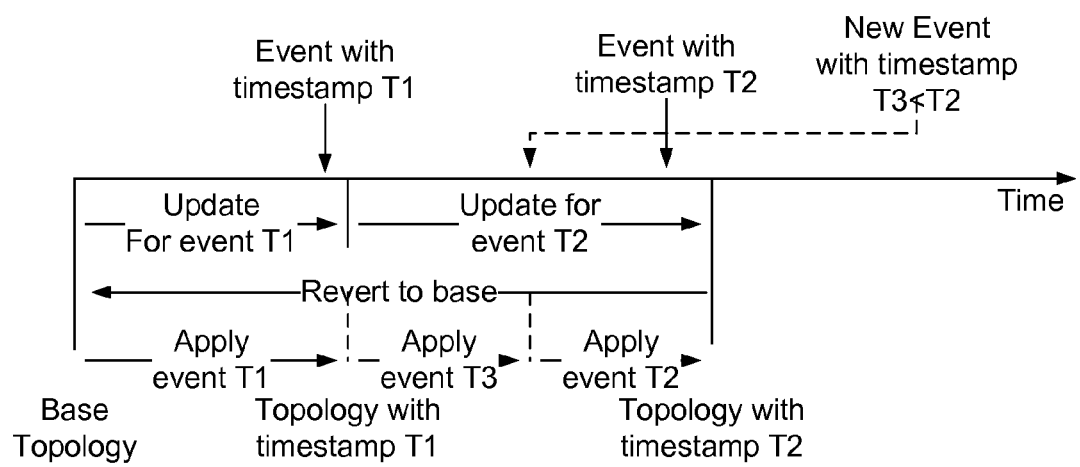

When a node with topology time stamped Tk learns of an event time-stamped Tj which occurred at a time before the time-stamp of its current topology, k>j, it will revert to an earlier topology, re-order the events to include the newly received event, and reapply all events that have occurred since timestamp of the earlier topology. An example of how this may be implemented is illustrated in FIGS. 9-11.

Figure 9:
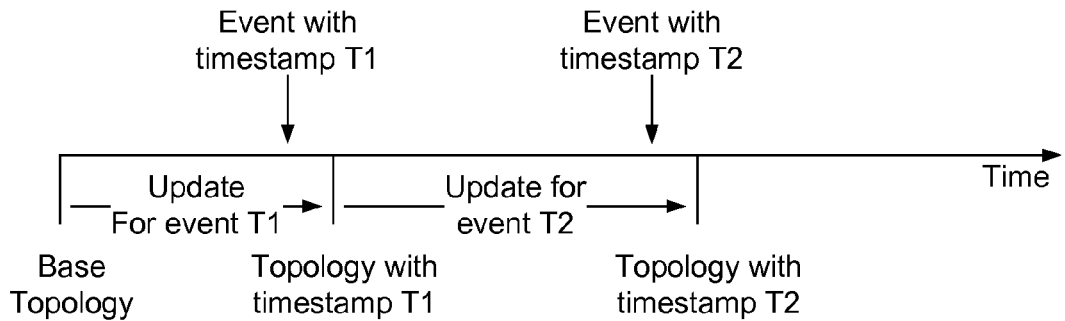
FIGS. 9-11 are timelines showing the timing of receipt of event notifications and the application of the event notifications to a node's topology database.

FIG. 9 shows how a node will process topology changes when events are received in order. As shown in FIG. 9, a node will have a base topology which is selected to be at a point in time sufficiently far back that it is statistically improbable that a subsequent event notification will be received that predates the time stamp of the base topology. For example, if it takes an event at most N time units to be disseminated to all nodes on the network, the base topology will reflect the topology of the network at least N time units ago.

In the example sequence shown in FIG. 9, the node then receives an event with a time-stamp T1. The event will be processed to update the node's topology. The node's new topology will be time-stamped with time T1 to coincide with the time-stamp of the most recently applied event.

As shown in FIG. 9, if the node subsequently receives another event notification with a time-stamp T2 which indicates that the event occurred at a point in time after the time-stamp T1 of the node's topology, the node will know that the topology at time-stamp T1 is up-to-date relative to the event with time-stamp T2, and the node will then simply apply the event T2 to update its topology. The new time-stamp for the topology will be updated to be T2. This process may continue with the node applying events as they are received as long as the events are received in chronological order.

Where an event is received with a time-stamp that is earlier in time than the time-stamp associated with the node's topology, however, the node will need to revert back to an earlier topology, apply the newly received events, and continue to apply the other events so that the events are applied in time-stamp order. FIGS. 10 and 11 illustrate two possible ways of achieving this.

For example, as shown in each of FIGS. 10 and 11, assume that the node initially receives the same sequence of events as discussed above in connection with FIG. 9. Specifically, the node first receives an event with time-stamp T1 and applies the event to create a topology database with a time-stamp T1. The node next receives a second event with a time-stamp T2 and updates its topology database to reflect this second event. Thus, at that point in time, the node has a topology with a time-stamp T2.

Assume now that a new event is subsequently received with a time-stamp T3 that is before the time-stamp of the current topology. Specifically, T3<T2. In the embodiment shown in FIG. 10, the node may revert to an intermediate topology having a time-stamp T1 that is earlier in time than the time-stamp associated with the new event, and then re-apply all events that have occurred since that point in time. In FIG. 10 this is illustrated by having the node revert to the topology time-stamped with T1, apply the newly received event (Event T3), and then apply the previously received event (Event T2).

Alternatively, as shown in FIG. 11, the node may revert to the base topology and apply all of the events in time-stamp order. Thus, for example in FIG. 11 the node would retrieve its base topology, discard any other topologies that it may have stored, and reapply all of the previously received events along with the newly received event, in time-stamp order, to create a new topology.

As discussed in connection with FIGS. 9-11, where events may be received out of order, the nodes need to be able to revert back to an earlier version of the topology database to ensure that all events are able to be ordered correctly before being applied to the topology database. This ensures that all nodes on the network apply the events in the same order and, hence, that all nodes are operating with the same view of the network topology when calculating routes for connections on the network.

Since a given node may operate on the network for an extended period of time, it may become difficult, from a memory/storage perspective, to maintain an infinite number of versions of the topology database. To alleviate this, the network node may be required to store only those versions of the topology database that are reasonably believed to be necessary at a later point in time, such that it is statistically unlikely for a network node to receive an event with a time-stamp earlier in time than the time-stamp of its topology database.

In a typical network there is a limit on the amount of time it takes a flood to make its way through the network. For example, if a node learns of an event and generates a notification that is flooded on the network, all reachable nodes on the network should receive the flood within a particular period of time. It will be assumed that this flood limit is N time units which may be, for example, several seconds or less. Since N represents the theoretical maximum amount of time it will take for every node to receive a flood from any other node, the node may expect that it will not receive any events that require it to revert to a topology time-stamped more than N units of time ago.

Figure 12:
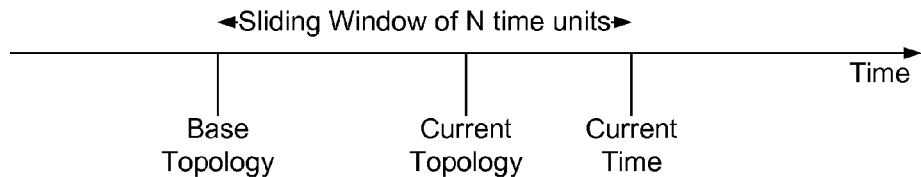
FIG. 12 is a timeline showing a sliding window of N time units between a node's base topology and current topology that may be used by the node to revert to an earlier topology upon receipt of an event notification.

Accordingly, as shown in FIG. 12, the node may implement a sliding window such that its base topology is a topology calculated at least N units earlier in time than its current topology or at least N units earlier in time than the most recent event notification. Depending on the implementation, the node may maintain each of the intermediate topologies (FIG. 10) or may maintain only the base topology and the current topology (FIG. 11). Each node will also maintain an ordered list of events that have occurred since the time associated with the base topology. If it is later necessary to insert another event into the ordered list, the node may revert back to the base topology (or to an intermediate topology) and reapply events including the new inserted event, to recalculate the new topology based on the new sequence of events. The base topology may be updated so that the base topology is selected to be the most recent topology that precedes the current topology by at least N time units. If no event is learned in N time units, then the current topology becomes the base topology and the previous topologies may be deleted from memory. Additionally, all stored events that are at least N time units old can be deleted from memory.

Figure 14:
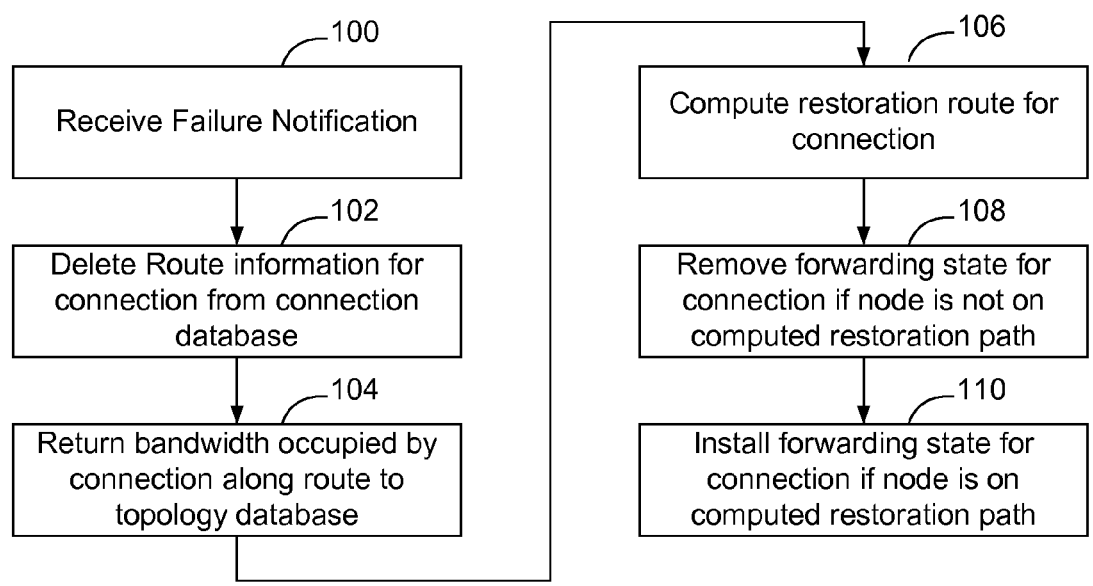
FIG. 14 is a flow chart showing a process performed by a node when processing an event notification.

FIG. 14 is a flowchart of a process that may be used by a node to update its topology database and forwarding state upon receipt of an event such as a failure notification. As shown in FIG. 14, when a node receives a failure notification (100) it will delete the route information for all connections affected by the failure notification (102). The node will also return any bandwidth occupied by the connection along the route into the topology database (104). Upon completion of these processes, the node is ready to calculate new routes for the affected connections. Accordingly, the node will proceed to compute a restoration route for each affected connection (106) in priority order. By calculating restoration routes for higher priority connections first, a network-wide connection priority restoration process may be implemented on the network. If the new route for the connection does not pass through the node, the node will remove any installed forwarding state for that connection (108). If, however, the new route for the connection does pass through the node, the node will either install forwarding state for the connection or modify any existing forwarding state to accord with the newly calculated forwarding state for the connection (110).

Figure 15:
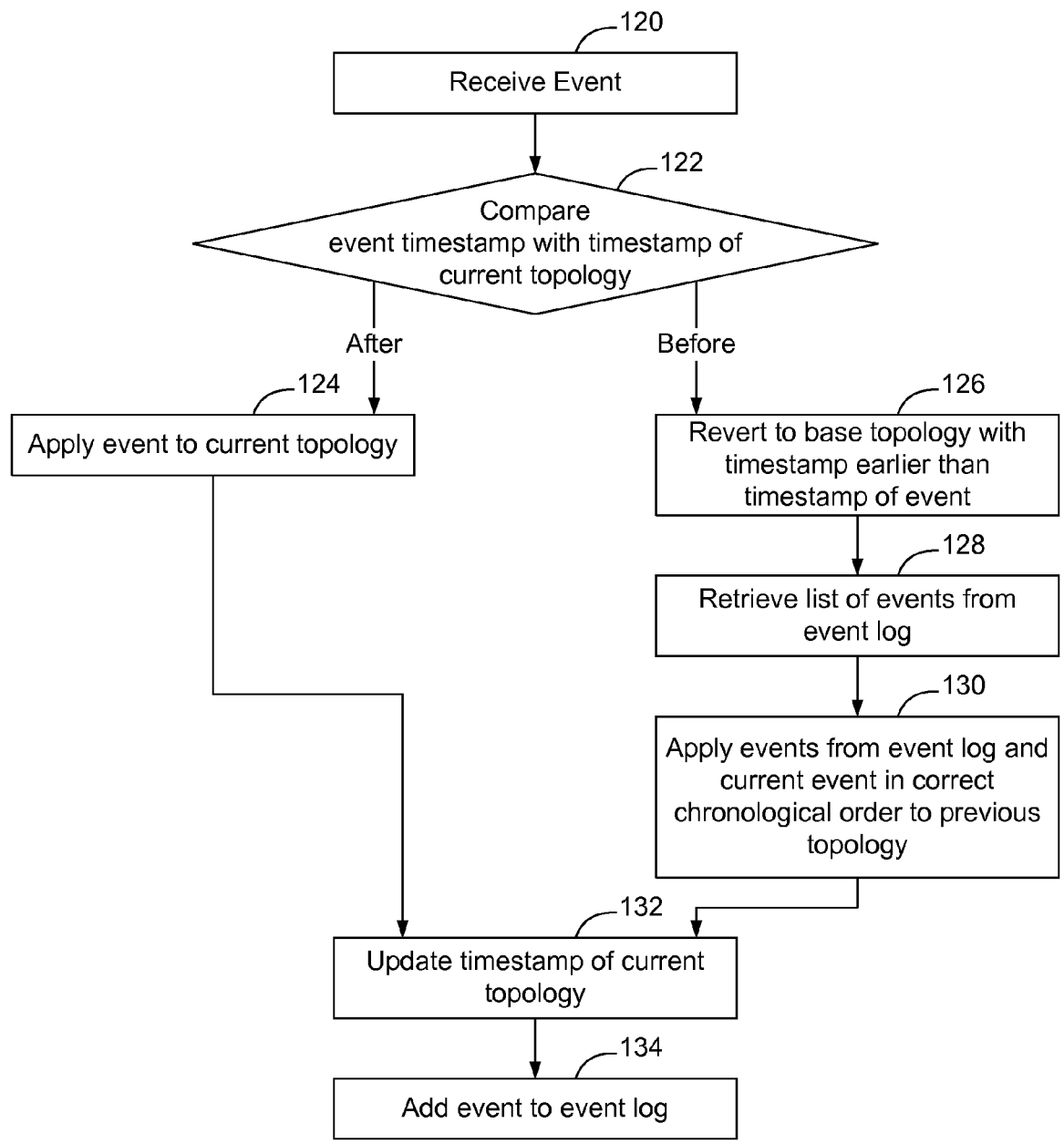
FIG. 15 is a flow chart showing a process performed by a node to keep track of the order of events on the network to allow the nodes to process topology change notifications in a consistent order.

FIG. 15 is a flowchart of a process that may be used by a node to apply a sequence of events to a topology database. As shown in FIG. 15, when the node receives an event (120), it will compare the event time-stamp with a time-stamp of its current topology (122). If the time-stamp of the event is after the time-stamp of the current topology, the node does not need to revert to an earlier topology and, hence, will simply apply the event to the current topology (124). For example, where the event is a failure notification the node may apply the event using the process described in connection with FIG. 14. Where the event is another type of event, such as a connection addition, the node may proceed to determine a route for the connection and install forwarding state as necessary. For a connection deletion, the node may simply update the topology database to show the newly available bandwidth and remove any forwarding state for the connection.

If the event has a time-stamp that indicates it occurred at a point in time before the timestamp of the node's current topology, the node will need to revert back to an earlier saved version of the topology database. Accordingly, the node will select a topology with a time-stamp that precedes the time-stamp of the event (126). The selected topology may be the base topology or an intervening topology where the node has stored more than one previous topology. After selecting a topology, the node will retrieve a list of events from the event log (128), insert the new event at the proper chronological position in the list, and then apply the events from the event log and the current event in the correct chronological order to the retrieved previous topology (130).

Once the event has been applied to the topology, the node will update the time-stamp of the current topology with the time-stamp of the most recent event that has been applied to the topology (132). The newly received event will also be added to the event log (134).

Since the primary goal is to have all the nodes apply the topology change updates in the same order, it is not essential that the nodes on the network be synchronized. Rather, if one of the nodes is out of synchronization with the other nodes, it will generate time stamps that are somewhat incorrect. Hence, it is possible that updates received from that node will be applied by the other nodes out of order from the true chronological order in which the events actually occurred on the network. This is tolerable since the main goal is to have all of the nodes apply events in the same order, regardless of whether the order that is used is the actual order in which the events occurred. Stated another way, it is OK for the nodes to apply the events in an incorrect order as long as they all apply they events the same way.

Preferably, the nodes should be mostly synchronized with each other so that the updates are being applied close in time to when they actually occurred. Where the nodes are grossly out of synchronization with each other, the time period N that the nodes use to select a base topology (See FIG. 12) should be increased to account for the non-synchronization.

The functions described above may be implemented as a set of program instructions that are stored in a computer readable memory and executed on one or more processors on the computer platform. However, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, a state machine, or any other device including any combination thereof. Programmable logic can be fixed temporarily or permanently in a tangible medium such as a read-only memory chip, a computer memory, a disk, or other storage medium. All such embodiments are intended to fall within the scope of the present invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of distributed connection establishment in a network, the method comprising:
   maintaining consistent views of network topology by a plurality of nodes on the network;
   advertising, by a head-end node of the plurality of nodes, in order to establish a new connection, constraints associated with the new connection to the plurality of nodes;
   calculating, by each node of the plurality of nodes on the network, a route identifying the head-end node, at least one intermediate node of the plurality of nodes, and a destination node of the plurality of nodes for the new connection based on the constraints; and
   installing a forwarding state for the new connection by each node on the calculated route, wherein installing the forwarding state for the new connection by each node on the calculated route comprises, for each node of the plurality of nodes:
      determining by the each node whether the each node is on the calculated route;
      if the each node is on the calculated route, installing on the each node the forwarding state for the new connection; and
      if the each node is not on the calculated route, not installing on the each node the forwarding state for the new connection.

2. The method of claim 1, wherein the network is a link state protocol controlled Ethernet network.

3. The method of claim 1, wherein the plurality of nodes maintains a connection database containing entries defining a plurality of connections that have been established on the network and a corresponding route for each of the plurality of connections.

4. The method of claim 1, wherein the constraints identify at least the head-end node, the destination node, an indication of the bandwidth associated with the new connection, and a priority indication for the new connection.

5. The method of claim 4, further comprising calculating a plurality of routes, each route corresponding to a different connection, in priority order.

6. The method of claim 1, wherein each node of the plurality of nodes maintains both a current view of the network topology having a first timestamp, an earlier view of the network topology having a second timestamp, and a list of time-stamped events that have occurred between a time associated with the earlier view of the network topology and a time associated with the current view of the network topology.

7. The method of claim 6, further comprising receiving an event notification containing a third timestamp.

8. The method of claim 7, wherein the event notification relates to at least one of addition of a new node or link on the network, deletion of a node or link on the network, a connection addition, a connection deletion, a failure of a node or link on the network, and a recovery of a previously failed node or link on the network.

9. The method of claim 7, further comprising comparing the third timestamp of the event notification with the first timestamp of the current view of the network topology.

10. The method of claim 9, further comprising applying the event notification to the current view of the network topology if the third timestamp of the event notification is after the first timestamp of the current view of the network topology.

11. The method of claim 9, further comprising reverting to the earlier view of the network topology if the third timestamp of the event notification is before the first timestamp of the current view of the network topology, and re-applying events from the list of time-stamped events along with the event notification.

12. A method of selectively installing a forwarding state by a node of a plurality of nodes on a link state protocol controlled Ethernet network, the method comprising:
   receiving, by the node from a head-end node, a link state protocol control message containing constraint information associated with a new connection to be established on the link state protocol controlled Ethernet network;
   calculating, by the node, a route for the new connection based on the constraint information and a view of a network topology of the link state protocol controlled Ethernet network, the route identifying the head-end node, at least one intermediate node of the plurality of nodes, and a destination node of the plurality of nodes for the new connection;
   updating, by the node, the view of the network topology to reflect the new connection on the calculated route;
   installing the forwarding state for the new connection, by the node, based on the determination, wherein installing the forwarding state for the new connection by each node on the calculated route comprises, for each node of the plurality of nodes:
      determining by the each node whether the each node is on the calculated route;
      if the each node is on the calculated route, installing on the each node the forwarding state for the new connection; and
      if the each node is not on the calculated route, not installing on the each node the forwarding state for the new connection.

13. The method of claim 12, further comprising:
   maintaining a connection database by the node, the connection database containing entries associated with connections that have been established on the link state protocol controlled Ethernet network, the entries containing at least the constraint information associated with the connections.

14. The method of claim 13, wherein the connection database maintains the connections in priority order.

15. The method of claim 14, further comprising:
receiving a fault notification indicating an occurrence of a fault on the link state protocol controlled Ethernet network;
updating the view of the network topology to reflect the fault;
determining, from the connection database, which connections are affected by the fault; and
calculating restoration routes for the affected connections in order of priority.

16. The method of claim 15, wherein calculating restoration routes for the affected connections comprises retrieving the constraint information associated with the connections and processing the constraint information against the view of the network topology to determine a restoration route for the connections.

17. The method of claim 16, wherein calculating restoration routes for the affected connections comprises:
returning bandwidth associated with the affected connections back to a network topology database;
selecting a highest priority connection;
determining a restoration route for the highest priority connection;
allocating bandwidth for the highest priority connection from the network topology database; and
selectively installing the forwarding state, by the node, if the node is on the restoration route for the highest priority connection;
iterating the steps of selecting, determining, allocating, and selectively installing for the remaining connections in priority order.

* * * * *